United States Patent [19]

Nagai et al.

[11] 3,939,495
[45] Feb. 17, 1976

[54] METHOD FOR ADJUSTING THE ANGLE OF ATTACK OF A FLOATING MAGNETIC HEAD

[75] Inventors: Hiroshi Nagai, Chigasaki; Yoshihiko Miyake, Odawara, both of Japan

[73] Assignee: Hitachi, Ltd., Japan

[22] Filed: Dec. 16, 1974

[21] Appl. No.: 533,024

[30] Foreign Application Priority Data

Dec. 19, 1973 Japan.............................. 48-141309

[52] U.S. Cl. ................ 360/103; 360/105; 360/109
[51] Int. Cl.². G11B 5/56; G11B 5/60; G11B 21/20
[58] Field of Search .......... 360/103, 102, 104, 105, 360/109, 130; 308/DIG. 1

[56] References Cited
UNITED STATES PATENTS

| | | |
|---|---|---|
| 2,961,494 | 11/1960 | Darou, Jr. et al.................. 360/104 |
| 3,177,495 | 4/1965 | Felts ................................... 360/103 |
| 3,187,112 | 1/1965 | Smith, Jr............................ 360/102 |
| 3,491,348 | 1/1970 | Bongaarts ......................... 360/103 |
| 3,657,710 | 4/1972 | Billawala........................... 360/103 |
| 3,720,932 | 3/1973 | Perkins et al. .................... 360/103 |
| 3,787,644 | 1/1974 | Schneider.......................... 360/109 |

Primary Examiner—Alfred H. Eddleman
Attorney, Agent, or Firm—Craig & Antonelli

[57] ABSTRACT

A method whereby the angle of attack formed by a slider acting as a floating magnetic head with respect to a magnetic member can be adjusted. The method includes selecting a speed of rotation of a magnetic member which is lower than the speed of rotation for normal operation of the member while the apparatus is in operation, rotating the member at approximately the preselected lower speed of rotation, and adjusting the angle of attack of the slider so that the slider will begin to float in the air approximately at the preselected lower speed of rotation.

6 Claims, 3 Drawing Figures

METHOD FOR ADJUSTING THE ANGLE OF ATTACK OF A FLOATING MAGNETIC HEAD

BACKGROUND OF THE INVENTION

This invention relates to a method for adjusting the angle of attack of a floating magnetic head.

Heretofore, in rotary memories of the prior art, it has been usual practice to employ a dynamic air floating system in which the magnetic head can be held in a position in which it is spaced apart from a magnetic recording medium a distance of several microns without coming into contact therewith by balancing the lift produced in the slider formed with an angle of attack when the laminar air flow produced on the surface of the rotary member strikes the slider with the biasing force of a spring which presses against the slider. In order that the slider may float in the air in a stable manner with respect to the surface of the rotary member, proposals have been made to use several different types of slider including a plane type, stepped type, chamfered type and crowning type. In all the types of slider, it is essential that a suitable angle of attack can be formed by avoiding the instability of the slider which may vibrate while floating and by ensuring that the slider is readily restored to its original position when exposed to a disturbance so that a predetermined spacing can be maintained between the slider and the rotary member at all times.

To this end, attempts have been made to select carefully the point in the slider at which the biasing force of the spring is exerted on the slider for producing lift therein or to use a gimbal, for example.

SUMMARY OF THE INVENTION

An object of the invention is to provide a method for effecting fine adjustments of the angle of attack which can have application in a disc apparatus which comprises a magnetic head of the floating type whose angle of attack can be varied from outside while the apparatus is in operation.

The outstanding characteristic of the invention is that the number of revolutions of the magnetic disc is set at a level which is lower than the steady number of revolutions thereof for normal operation of the apparatus, and the angle of attack of the slider is adjusted so that the slider supporting a magnetic head will begin to float in the air at approximately the aforementioned number of revolutions.

DESCRIPTION OF THE PREFERRED EMBODIMENT

Figure 1:
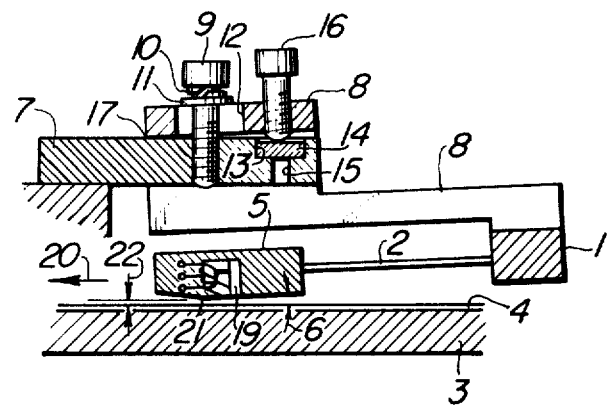
FIG. 1 is a sectional view of a magnetic head of the floating type incorporating therein the mechanism for adjusting the angle of attack of a slider adapted for carrying the method of the present invention into practice, showing the magnetic head floating in the air without being brought into contact with the magnetic disc.
Figure 2:
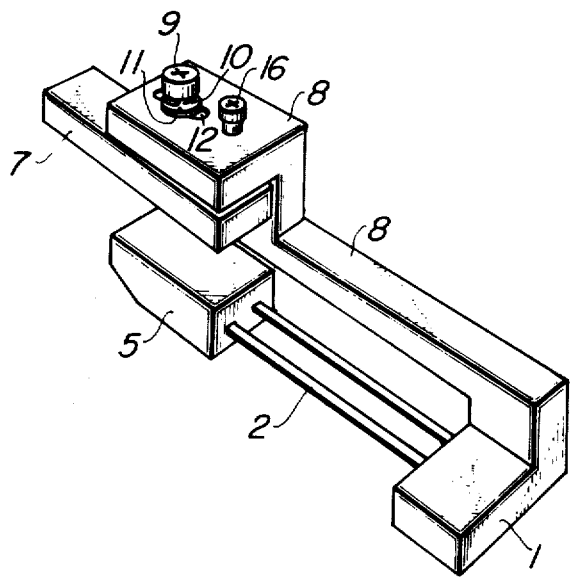
FIG. 2 is a perspective view of the magnetic head of the floating type shown in FIG. 1.

A preferred embodiment of the invention will now be described with reference to the accompanying drawings. In FIG. 1 and FIG. 2, there is shown a magnetic head of the floating type incorporating therein the mechanism for adjusting the angle of attack of a slider adapted to carry the method of the invention into practice. The numeral 1 refers to a block from which extend a plurality of springs 2 arranged parallel to each other for resiliently supporting a slider 5 relative to a magnetic coating 4 provided on the surface of a disc 3. The slider 5 is formed with an angle of attack 6 which can be varied by means of a specific mechanism. The detailed construction of such mechanism will be described hereinafter.

A bar 7 extends from a portion of the apparatus and is disposed in overhanging relation with the disc 3. A head supporter 8, which forms a part of the block 1, is mounted on the bar 7 and held in position on the bar 7 by a clamp screw 9 through a spring washer 10 and a flat washer 11. The clamp screw 9 extends through a slot 12 formed in the head supporter 8 so that the position of the head supporter 8 can be varied longitudinally of the bar 7 by moving the same forwardly or rearwardly.

A circular recess 13 is formed in the bar 7 and disposed anterior to the clamp screw 9 for receiving therein a quench hardened seat 14. A bore 15 concentric with the recess 13 is formed in the bar 7 and disposed beneath the seat 14. Thus, when it is desired to remove the seat 14 from the recess 13, the end can be attained by moving the seat 14 upwardly by inserting a pin or the like in the bore 15.

A threaded opening is formed in a portion of the head supporter 8 which overlies the seat 14 to threadably receive therein a push-up screw 16. By turning the push-up screw 16 in a direction in which the screw 16 moves further downwardly while its lower end is maintained in abutting engagement with the seat 14, it is possible to push upwardly the head supporter 8 as a whole and cause the same to move in pivotal motion about a point 17 shown in FIG. 3.

If it is desired to effect adjustments of the angle of attack 6 of the slider 5, the end can be attained by slightly loosening the clamp screw 9 in the operation range of the spring washer 10 and then turning the push-up screw 16 in a direction in which it moves further downwardly in the threaded opening, for example. The movement of the push-up screw 16 pushes the seat 14, so that the head supporter 8 will move leftwardly or counter clockwise in FIG. 1 about the point 17. This will cause a change to occur in the angle of attack 6. When the angle of attack 6 is set at a desired level, the slider can be fixed in position to maintain the angle of attack 6 at the set level, if the clamp screw 9 is tightened with a suitable torque.

Figure 3:
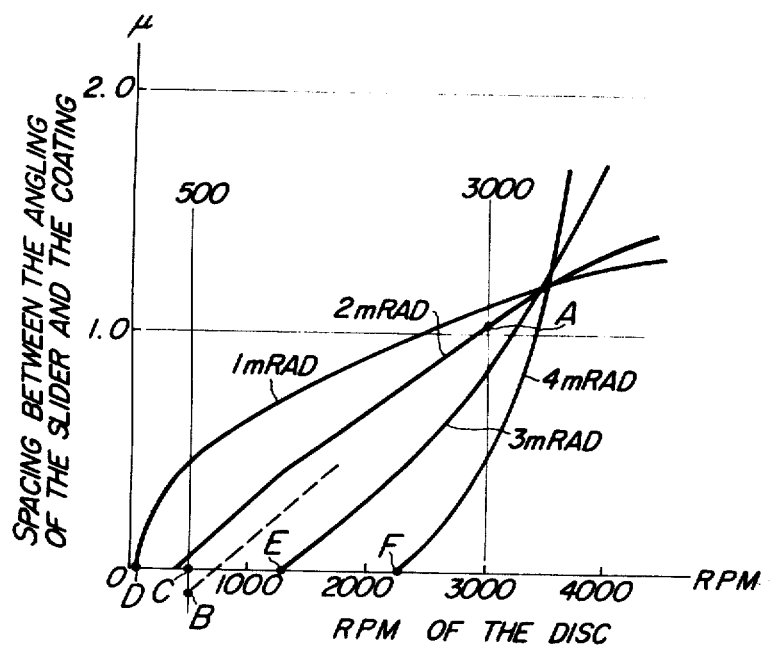
FIG. 3 is a characteristics graph in explanation of the method for adjusting the angle of attack according to the invention, showing changes in the floating characteristics of the slider or spacings between the slider and the magnetic disc which would be produced when the number of revolutions of the disc and the angle of attack are varied.

In using the magnetic head of the floating type provided with the afore-mentioned mechanism for adjusting the angle of attack, if the disc 3 is rotated in the direction of an arrow 20 by setting the angle of attack at several different levels and varying its number of revolutions, the values of a distance or spacing 22 between an angling 21 of the slider 5 and the coating can be expressed in diagrammatic form as shown in FIG. 3.

In FIG. 3, it will be seen that, if the value of the angle of attack 6 is set at $2 \times 10^{-3}$ radians ($10^{-3}$ radians shall hereinafter be expressed as mRAD), the spacing 22 between the angling 21 of the slider 5 and the coating 4 of the disc 3 will have a value which is shown in the scale of the vertical axis when the number of revolutions of the disc 3 attains a level of about 400 rpm as indicated at a point C on the transverse axis after its rotation is initiated, thereby indicating that the slider 5 has begun to float in the air. Likewise, it will be seen that it is when the number of revolutions is about 80 rpm as indicated at a point D that the slider 5 begins to float in the air in case the angle of attack 6 is 1 mRAD, that it is when the number of revolutions is about 1,280 rpm as indicated at a point E that the slider 5 begins to float in the air in case the angle of attack 6 is 3 mRAD, and that it is when the number of revolutions is about 2,240 rpm as indicated at a point F that the slider 5 begins to float in the air in case the angle of attack 6 is 4 mRAD. While the angling 21 of the slider 5 is in sliding contact with the coating 4, the sound produced by the sliding contact maintained between them can be heard by the operator. Thus the initiation of floating of the slider 5 will coincide in timing with the disappearance of the sliding sound.

The method according to the invention will now be described in detail by which it is possible to obtain, based on the graph shown in FIG. 3 and by ascertaining the disappearance of the sliding sound, a value for the spacing 22 which is suitable for carrying out magnetic recording by means of a magnetic head 19 mounted in the slider 5 at any number of revolutions of the disc 3 for normal operation as desired.

For example, when it is desired to obtain a value of 1.0 micron for the spacing 22 between the magnetic head 19 and the magnetic coating 4 of the disc 3 by setting the number of revolutions of the disc for normal operation at 3,000 rpm, a point of close approximation A is selected on the graph in FIG. 3. Thus it will be seen that the angle of attack 6 required is 2 mRAD. Then the angle of attack 6 is set at this value by setting the number of revolutions of the disc 3 at 500 rpm which is a value of close approximation to the initial number of revolutions or about 400 rpm for the curve of 2 mRAD plotted in FIG. 3. Thereafter the clamp screw 9 is loosened and the push-up screw 16 of the adjusting mechanism shown in FIG. 1 is turned in a direction in which the screw 16 is tightened so as to set the angle of attack at a slightly higher level as indicated at a point B by ascertaining that there is a sliding sound produced by the contact of the angling 21 of the slider 5 with the coating 4. This operation is followed by an operation for turning the push-up screw 16 in a direction in which it is loosened to thereby cause the slider 5 to move in pivotal motion through a very small angle about the point 17 to reduce the angle of attack 6. This operation is continued till the sliding sound disappears. The turning of the push-up screw 16 is stopped when the sliding sound disappears, thereby producing a condition indicated at a point C in FIG. 3. Thus the angle of attack 6 can be set at a value which is a close approximation to 2 mRAD.

As can be seen in FIG. 3, the difference between the numbers of revolutions of the disc 3 for the slider to begin to float in the air when the angle of attack 6 has values of 1 mRAD and 3 mRAD is the difference between 80 rpm indicated at a point D and 1,280 rpm indicated at a point E which is 1,200 rpm. From this, it will be possible to conclude that when the angle of attack is increased or decreased by 1 mRAD from 2 mRAD there is a difference of 1,200 rpm in the number of revolutions of the disc 3. It will be appreciated that the invention permits fine adjustments of the angle of attack, which have hitherto been considered impossible to carry out, to be effected by setting the number of revolutions of the magnetic disc at a level which is lower than its number of revolutions for normal operation and by ascertaining the floating of the slider based on the disappearance of the sliding sound. While the invention has been described as using the disappearance of the sliding sound in determing the timing of the initiation of floating of the slider in the air, it is to be understood that the invention is not limited to this specific form of determination and that the initiation of floating of the slider can be determined by ascertaining a change in the voltage flowing from the magnetic head, for example.

We claim:

1. A method for adjusting the angle of attack of a floating magnetic head comprising selecting a speed of rotation of a magnetic member which is lower than the speed of rotation for normal operation of the magnetic member while the apparatus is in operation, rotating the magnetic member at approximately the preselected lower speed of rotation, and adjusting the angle of attack of the slider supporting the magnetic head so that the slider begins to float in the air approximately at the preselected lower speed of rotation of the magnetic member.

2. A method according to claim 1, wherein the lower speed of rotation is selected in accordance with a predetermined angle of attack and a predetermined desired spacing of the slider from the magnetic member at normal rotational speed of the magnetic member, whereby upon adjusting the angle of attack so that the slider floats in the air at approximately the preselected lower speed of rotation and rotating the magnetic member at the normal rotational speed, the slider becomes spaced approximately the predetermined desired distance from the magnetic member.

3. A method according to claim 1, wherein the magnetic member is a disc member and adjusting the angle of attack so that the slider floats above the surface of the disc.

4. A method according to claim 1, wherein the step of adjusting the angle of attack includes placing the slider in contact with the magnetic member and adjusting the angle of attack until the slider loses contact with the magnetic member at approximately the preselected lower speed of rotation thereof.

5. A method for adjusting the angle of attack of a floating magnetic head so as to provide a predetermined spacing of the magnetic head from a rotating magnetic member a the normal rotational speed of the magnetic member comprising the steps of selecting a speed of rotation of the magnetic member which is lower than the normal speed of rotation thereof, rotating the magnetic member at approximately the preselected lower speed of rotation, and adjusting the angle of attack of the slider supporting the magnetic head so that the slider begins to float in the air approximately at the preselected lower speed of rotation, whereby upon rotating the magnetic member at the normal rotational speed thereof the slider floats at the desired distance from the rotating magnetic member.

6. A method according to claim 5, wherein the magnetic member is a magnetic disc and the step of adjusting the angle of attack includes contacting the slider with the surface of the disc and adjusting the angle of attack until the slider loses contact with the disc at approximately the preselected lower speed of rotation.

* * * * *